United States Patent [19]

Tu

[11] Patent Number: 4,544,950
[45] Date of Patent: Oct. 1, 1985

[54] TECHNIQUE FOR THE TRANSMISSION OF VIDEO AND AUDIO SIGNALS OVER A DIGITAL TRANSMISSION SYSTEM

[75] Inventor: Peter J. Tu, Colts Neck, N.J.

[73] Assignee: AT&T Bell Laboratories, Murray Hill, N.J.

[21] Appl. No.: 567,538

[22] Filed: Jan. 3, 1984

[51] Int. Cl.$^4$ ............................................. H04N 7/04
[52] U.S. Cl. .................................... 358/143; 358/11; 358/141; 370/4
[58] Field of Search .............................. 358/143–146, 358/11, 13, 141, 142; 370/4

[56] References Cited

U.S. PATENT DOCUMENTS

| | | | |
|---|---|---|---|
| 3,936,595 | 2/1976 | Yanagimachi et al. | 358/143 |
| 4,441,180 | 4/1984 | Schüssler | 370/4 |
| 4,479,142 | 10/1984 | Buschman et al. | 358/11 |
| 4,481,621 | 11/1984 | Schmark et al. | 370/4 |
| 4,491,953 | 1/1985 | Bellisio et al. | 375/27 |

OTHER PUBLICATIONS

IEEE Trans. Comm., vol. COM-26(5), May 1978, "Design Technique for Multiplexing Asynchronous Digital Video and Audio Signals", by J. H. Stott, pp. 601–610.
WE Network News Marketing Comm., Apr. 1983, "New WE Digital TV Lightwave System".
IEEE J. Selected Areas in Comm., vol. SAC-1(3), Apr. 1983, "FT3C-A Lightwave System for Metropolitan and Intercity Applications", by J. Stauffer, pp. 413–419.

*Primary Examiner*—Michael A. Masinick
*Assistant Examiner*—Michael D. Parker
*Attorney, Agent, or Firm*—Erwin W. Pfeifle

[57] ABSTRACT

The present invention relates to a technique for transmitting both a video and a plurality of audio signals within a predetermined signal format which is compatible with a known signal format not normally used for television transmission. More particularly, the video signal is sampled at a first multiple of the video subcarrier frequency. The digitized video signal and associated video mode status bits are then multiplexed with the plurality of digitized audio signals into an N-bit frame format using a second multiple of the video subcarrier frequency which is less than the line frequency of the known signal format. The N-bit frames are then sectioned into Y-bit subframes and multiplexed with auxiliary and monitoring bit information comprising, for example, frame location bits for the Y-bit subframes using a third multiple of the video subcarrier frequency to generate a system signal format which is compatible with the known signal format. At a receiving end the system signal format is demultiplexed in a reverse manner to the multiplexing sequence at the transmitter.

12 Claims, 7 Drawing Figures

FIG. 1
(PRIOR ART)

| $F_1F_0$ | 174I | $A_1M_1$ | 174I | $F_1F_0$ | 174I | $A_2M_0$ | 174I | $F_1F_0$ | 174I | $A_3M_1$ | 174I | $F_1F_0$ | 174I | $A_4P_1$ | 174I |
|---|---|---|---|---|---|---|---|---|---|---|---|---|---|---|---|
| $F_1F_0$ | 174I | $A_1M_0$ | 174I | $F_1F_0$ | 174I | $A_2M_1$ | 174I | $F_1F_0$ | 174I | $A_3M_0$ | 174I | $F_1F_0$ | 174I | $A_4P_2$ | 174I |
| $F_1F_0$ | 174I | $A_1C_a$ | 174I | $F_1F_0$ | 174I | $A_2C_a$ | 174I | $F_1F_0$ | 174I | $A_3C_a$ | 174I | $F_1F_0$ | 174I | $A_4C_a$ | 174I |
| $F_1F_0$ | 174I | $A_1C_a$ | 174I | $F_1F_0$ | 174I | $A_2C_a$ | 174I | $F_1F_0$ | 174I | $A_3C_a$ | 174I | $F_1F_0$ | 174I | $A_4C_a$ | 174I |
| $F_1F_0$ | 174I | $A_1C_b$ | 174I | $F_1F_0$ | 174I | $A_2C_b$ | 174I | $F_1F_0$ | 174I | $A_3C_b$ | 174I | $F_1F_0$ | 174I | $A_4C_b$ | 174I |
| $F_1F_0$ | 174I | $A_1C_b$ | 174I | $F_1F_0$ | 174I | $A_2C_b$ | 174I | $F_1F_0$ | 174I | $A_3C_b$ | 174I | $F_1F_0$ | 174I | $A_4C_b$ | 174I |
| $F_1F_0$ | 174I | $A_1C_c$ | 174I | $F_1F_0$ | 174I | $A_2C_c$ | 174I | $F_1F_0$ | 174I | $A_3C_c$ | 174I | $F_1F_0$ | 174I | $A_4C_c$ | 174I |
| $F_1F_0$ | 174I | $A_1C_c$ | 174I | $F_1F_0$ | 174I | $A_2C_c$ | 174I | $F_1F_0$ | 174I | $A_3C_c$ | 174I | $F_1F_0$ | 174I | $A_4C_c$ | 174I |

I: INFORMATION BITS  
F: FRAMING BITS  
M: M-FRAME BITS  
C: STUFF INDICATOR BITS  
P: PARITY BITS  
A: AUXILIARY INFORMATION BITS

FIG. 5

| $F_1F_0$ | 174TV | $AM_1$ | 174TV | $F_1F_0$ | 174TV | $AM_0$ | 174TV | $F_1F_0$ | 174TV | $AM_1$ | 174TV | $F_1F_0$ | 174TV | $AP$ | 174TV |
|---|---|---|---|---|---|---|---|---|---|---|---|---|---|---|---|
| $F_1F_0$ | 174TV | $AM_0$ | 174TV | $F_1F_0$ | 174TV | $AM_1$ | 174TV | $F_1F_0$ | 174TV | $AM_0$ | 174TV | $F_1F_0$ | 174TV | $AP$ | 174TV |
| $F_1F_0$ | 174TV | $AX$ | 174TV | $F_1F_0$ | 174TV | $AX$ | 174TV | $F_1F_0$ | 174TV | $AX$ | 174TV | $F_1F_0$ | 174TV | $AX$ | 174TV |
| $F_1F_0$ | 174TV | $AX$ | 174TV | $F_1F_0$ | 174TV | $AX$ | 174TV | $F_1F_0$ | 174TV | $AX$ | 174TV | $F_1F_0$ | 174TV | $AX$ | 174TV |
| $F_1F_0$ | 174TV | $AX$ | 174TV | $F_1F_0$ | 174TV | $AX$ | 174TV | $F_1F_0$ | 174TV | $AX$ | 174TV | $F_1F_0$ | 174TV | $AX$ | 174TV |
| $F_1F_0$ | 174TV | $AX$ | 174TV | $F_1F_0$ | 174TV | $AX$ | 174TV | $F_1F_0$ | 174TV | $AX$ | 174TV | $F_1F_0$ | 174TV | $AX$ | 174TV |
| $F_1F_0$ | 174TV | $AX$ | 174TV | $F_1F_0$ | 174TV | $AX$ | 174TV | $F_1F_0$ | 174TV | $AX$ | 174TV | $F_1F_0$ | 174TV | $AX$ | 174TV |
| $F_1F_0$ | 174TV | $AX$ | 174TV | $F_1F_0$ | 174TV | $AX$ | 174TV | $F_1F_0$ | 174TV | $AX$ | 174TV | $F_1F_0$ | 174TV | $AX$ | 174TV |

I: INFORMATION BITS  
F: FRAMING BITS  
M: M-FRAME BITS  
P: PARITY BITS  
X: X(INFORMATION) BITS  
A: AUXILIARY INFORMATION BITS

| $A_I$ | $A_I$ | 48V | $V_I$ | $V_I$ | 48V | $A_I$ | $A_I$ | 48V | $V_I$ | $V_I$ | 48V |

WHERE $F_1$ = FRAMING BIT
$A_I$ AUDIO BIT
V VIDEO BIT
$V_I$ VIDEO MODE STATUS BIT

| $A_I$ | 24V | $V_I$ | 24V | $A_I$ | 24V | $V_I$ | 24V |

TV2 = | $A_I$ | 24V | $V_I$ | 24V | $A_I$ | 24V | $V_I$ | 24V |

| $A_I$ | 24V | $V_I$ | 24V | $A_I$ | 24V | $V_I$ | 24V |

WHERE $F_1$ = FRAMING BIT
$A_I$ AUDIO BIT
V VIDEO BIT
$V_I$ VIDEO MODE STATUS BIT

4,544,950

TECHNIQUE FOR THE TRANSMISSION OF VIDEO AND AUDIO SIGNALS OVER A DIGITAL TRANSMISSION SYSTEM

TECHNICAL FIELD

The present invention relates to a technique for transmitting a video and a plurality of audio signals over a digital transmission system and, more particularly, to a technique for transmitting a video and a plurality of audio signals in a signal format which is compatible for transmission over a predetermined transmission medium as, for example, a FT3C lightwave line.

BACKGROUND OF THE INVENTION

It is always desirable to be able to provide a new service which can be made compatible for transmission over an existing medium, such as a cable or satellite link which is capable of propagating a predetermined bit transmission rate or signal format. One such application is disclosed in the article "Design Technique For Multiplexing Asynchronous Digital Video and Audio Signals" by J. H. Stott in *IEEE Transactions on Communications,* Vol COM-26, No. 5, May 1978 at pages 601–610. There, apparatus is designed for providing multiplexed asynchronous digital video and audio signals in a predetermined signal format for transmission on a 120 Mbit/s digital line system or a 60 Mbit/s Intelsat IV satellite link. In the Stott arrangement, one asynchronous video and six audio signals are multiplexed into sequential frames, where each frame comprises 300 six-bit words as shown in FIG. 5 of the article. These sequential frames form the structure of the 60 Mbit/s multiplexed signal. Since the video signals are asynchronous, "justification", also known as "pulse stuffing" techniques, are used to aid in providing the 60 Mbit/s signal format.

A lightwave system for transmitting voice and data signals is described in the article "FT3C—A Lightwave System for Metropolitan and Intercity Applications" by J. R. Stauffer in *IEEE Journal On Selected Areas In Communications,* Vol. SAC-1, No. 3, April 1983 at pages 413–419. The FT3C lightwave system multiplexes three 90.524 Mbit/s signals on a single-fiber pair and interfaces with DS1, DS1C, DS2 or DS3 signals. The regular FT3C line terminates in a MX3C Lightwave Terminating Frame (LTF) and the Lightwave Terminating Module in the LTF combines two DS3 signals and inserts framing, parity, pulse stuffing indicator and auxiliary bits in accordance with a signal format shown in present FIG. 1, and referred to hereinafter as the 90A format. Since the 90A signal format is sent over the FT3C line, the test equipments for use with the FT3C system are designed to operate with such signal format.

In the 90A signal format shown in present FIG. 1, the $F_1F_0$ designations each equal a "10" bit pair which locates each 174-bit block of information, the $A_1$–$A_4$ designations indicate the bit locations associated with auxiliary channels 1–4, respectively, the $P_1$ and $P_2$ bits comprise the two parity bit locations, and the $C_a$ to $C_c$ bit locations provide the stuffing bit indications. The 90A format of FIG. 1 is transmitted starting at the top left-hand corner of the figure and proceeds across the rows to the bottom right-hand corner of the figure.

The problem remaining in the prior art is to multiplex one video and a plurality of audio signals into a signal format which is compatible with the 90A signal format which permits both the transmission of the multiplexed signal over a FT3C line and, in turn, the adoption of the FT3C test equipments and maintenance practices.

SUMMARY OF THE INVENTION

The foregoing problem in the prior art has been solved in accordance with the present invention which relates to a technique for transmitting a video and a plurality of audio signals over a digital transmission system and, more particularly, to a technique for transmitting a video and a plurality of audio signals in a signal format which is compatible for transmission over a predetermined transmission medium as, for example, a FT3C lightwave line.

It is an aspect of the present invention to provide apparatus which will format a digitized video signal, its associated control bits, and a plurality of digitized audio signals into a predetermined N-bit frame of television data which is synchronized to a multiple of the video color subcarrier frequency. The resulting television data is then inserted into sections of an overall predetermined system signal format which has its bit rate synchronized to another multiple of the video subcarrier frequency and is compatible for transmission over a predetermined system medium.

Other and further aspects of the present invention will become apparent during the course of the following description and by reference to the accompanying drawings.

BRIEF DESCRIPTION OF THE DRAWINGS

Referring now to the drawings:

FIG. 1 is a tabular diagram of the known 90A signal format used over an FT3C line;

FIG. 5 is a tabular diagram of a signal format similar to FIG. 1 for transmitting the video and audio information shown in either one of the arrangements of FIG. 3 or FIG. 4.

DETAILED DESCRIPTION

The present invention relates to apparatus which will permit the transmission of one video signal, associated video control bits, and a plurality of audio signals in a signal format which is compatible with an existing type of signal format not used for video signal transmission. In this manner it will be possible to transmit the present signal format over the type of line or system that was used to transmit the existing type of signal format.

The description which follows is directed to showing how the present invention combines one video signal and a plurality of audio signals into a frame format which is synchronized to the video color subcarrier frequency ($f_{sc}$), which frame format is then multiplexed into a system frame format. The hereinafter description is further directed to the conversion of a standard National Television Standards Committee (NTSC) color video signal and two 15 kHz audio signals to a 90 Mbit/s optical signal which is compatible with the exemplary 90A signal format of FIG. 1 and, therefore, can be transmitted over an FT3C lightwave repeatered line which uses such system signal format. It is to be understood that such description is for purposes of exposition and not for purposes of limitation, since the principles of the present invention can also be applied to generating other similar types of signal formats and bit rates used by other types of lines.

Figure 2:
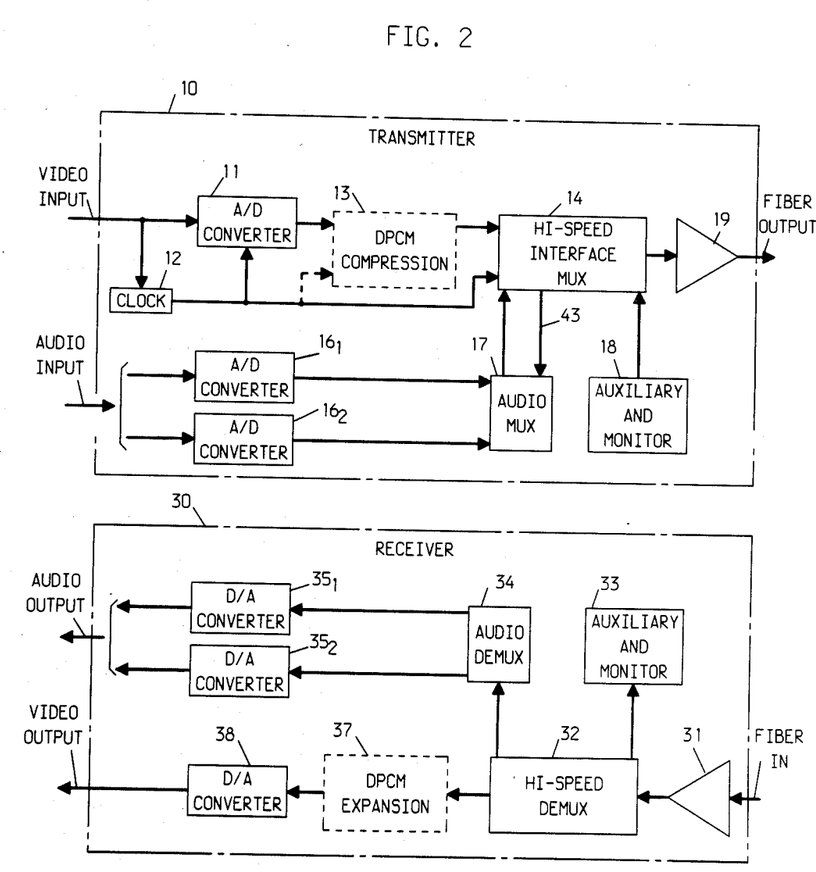
FIG. 2 is a block of a preferred arrangement of a transmitter and receiver for transmitting and receiving one video and a plurality of audio signals in a signal format according to the present invention.

FIG. 2 is a block diagram of a preferred arrangement of a transmitter and receiver multiplexing section for transmitting and receiving one video and a plurality of audio signals in a signal format according to the present invention. In the transmitter portion 10, an analog NTSC video signal is received in an analog-to-digital converter (A/D) 11 and a clock circuit 12. In the A/D converter 11, the analog video input signal is converted into an S-bit digital encoding of the video signal at the output thereof, where S can equal, for example, 9. The clock circuit 12 functions to lock onto the video color subcarrier frequency $f_{sc}$ which in the NTSC signal is equal to 3.579545 MHz. Clock circuit 12, in turn, generates output clock pulses at one or more predetermined multiples of the color subcarrier frequency for distribution to other circuits in transmitter 10.

More particularly, in order to match the quality of existing analog television transmission systems, and to allow multiple A/D terminals in tandem, the exemplary 9-bit encoding of the video signal in A/D converter 11 would be most practical. It should be further recognized that in the A/D conversion process, the sampling rate should be locked to the color subcarrier frequency, $f_{sc}$, present in the composite video signal. The primary candidates for the sampling frequency are $3f_{sc}$ and $4f_{sc}$, which are both above the Nyquist frequency of the video signal. At $4f_{sc}$, however, it is easier to design the anti-aliasing filter, but at the expense of requiring a higher bit rate. As a result, the raw video bit rate is estimated to be between $9\times3=27f_{sc}$ (96.7 Mb/s) and $9\times4=36f_{sc}$ (128.9 Mb/s).

If the nominal line rate is an exemplary 90.524 Mb/s, as found in the exemplary FT3C line, such line rate translates to approximately $25.3f_{sc}$. Thus, Pulse Code Modulation (PCM) video data must be compressed to a signal rate of $25f_{sc}$ or less, so that it can be multiplexed into the high speed line signal. A natural choice under such condition is $24f_{sc}$ which is the common multiple of $3f_{sc}$ and $4f_{sc}$ that is the closest to $25f_{sc}$. Thus, if a sampling rate of $4f_{sc}$ is adopted, the exemplary 9-bit video word can be compressed to a 6-bit video word for a total signal rate of $24f_{sc}$. If the $3f_{sc}$ approach is adopted instead, the 9-bit video words can be compressed to 8-bit video words, again resulting in $24f_{sc}$. In addition to the $24f_{sc}$ assigned to the compressed video signal, some extra capacity can be set aside for possible other video needs. For this purpose, an arbitrary allocation of $\frac{1}{2}f_{sc}$ can be made and hereinafter will be used for conveying the video processor's "operating mode" status information. It is to be understood that if the PCM video data is at some common integer multiple of $f_{sc}$ which requires compression, then a compression circuit 13 can be disposed after A/D converter 11 to perform such function. As shown in FIG. 2, compression circuit 13 can be a Differential PCM (DPCM) compression circuit as is well known in the art, or any other suitable type of compression circuit. The output from A/D converter 11, or optional compression circuit 13, provides one input to a high-speed interface multiplexer 14, which will be described in greater detail hereinafter.

With reference to the audio channels, it will be assumed hereinafter that only two audio channels are desired to be transmitted with the video information. It is to be understood, however, that the exemplary video needs described hereinbefore are only $24.5f_{sc}$ and the remaining portion making up the nominal line rate of $25.3f_{sc}$ of the exemplary FT3C line can be used to transmit any amount of audio channels which can be accommodated by such remainder.

For purposes of illustration, it is assumed that the basic audio requirements for the present system is to carry two 15 KHz high fidelity sound channels. These first and second analog audio signals are each converted in A/D converters $16_1$ and $16_2$, respectively, into representative digital signals. The A/D converters $16_i$ can sample the audio signals at a predetermined rate as, for example, 32 KHz, which includes a predetermined accuracy as, for example, a 14-bit accuracy. This exemplary 14-bit word can then be compressed, if desired, and a parity bit added which would result in a signal rate of 384 Kb per channel. For purposes of illustration, two 384 Kb per channel audio signals could be multiplexed into one-half of a T1 carrier line (772 Kb/s). Since a T1 line requirement is 1.544 Mb/s which would equal only $0.43f_{sc}$, four audio signals could be transmitted if desired, with a total requirement of only $24.93f_{sc}$ including the video signals. Returning to FIG. 2, the separate digital output signals from A/D converters $16_1$ and $16_2$ are transmitted to an audio multiplexer 17 which multiplexes the two digital bit streams into a single output bit stream which is received as a second input to high-speed interface multiplexer 14.

With reference to synchronization, there basically are three frequency sources which could be used in the present system. There are the video signal frequency, the audio signal frequency and the FT3C line frequency which must be synchronized by multiplexer 14. The common technique of synchronizing these signals would be to provide an accurate and stable frequency source at the line frequency. The video and audio signals are then pulse-stuffed to the line frequency. In accordance with the present invention, there already exists an accurate and stable frequency source, namely the color subcarrier frequency $f_{sc}$. Both the video signal and the "video mode" status signal are already locked to $f_{sc}$. It is, therefore, advantageous to have the line frequency also locked to $f_{sc}$. Such technique would eliminate the need for pulse stuffing the video signals and for an additional frequency source. Pulse stuffing of the audio signals, however, would still be required.

In FIG. 2, a third source of signals to be sent in the overall system signal format would be various auxiliary and monitoring information as, for example, system framing bits, parity bits, auxiliary channel data etc. as may be found in other than the 174-bit information sections in the format of FIG. 1. Such data, or bits, are generated by the Auxiliary and Monitor circuit 18 and transmitted to a third input of high-speed interface multiplexer 14. The overall multiplexed signal from interface multiplexer 14 is then sent through a lightwave regenerator 19 for transmission over the exemplary FT3C lightwave system line. It is to be understood that regenerator 19 could be replaced by any circuit that might be necessary to match the output of interface multiplexer 14 with the system output channel. For example, if the system output channel were a radio channel, circuit 19 could be an appropriate upconverter rather than a lightwave regenerator.

Turning now to the functioning of high-speed interface multiplexer 14, it is to be understood that interface multiplexer 14 can be thought of as a two-step function. The first step would be to combine the video information, video mode status information, and the two audio signals into a first signal format. The second step would be to then multiplex the resultant signal format from the first step with the auxiliary and monitor information from circuit 18 to produce an overall signal format which is compatible with the exemplary 90A signal format shown in FIG. 1.

With regard to the first multiplexing step of interface multiplexer 14, the compressed video signal, the "video mode" status bits and the audio signals must be multiplexed into a $25f_{sc}$ data stream. As specified hereinbefore for the exemplary FT3C system, the bit rate of the compressed video signal is $24f_{sc}$, and the "video mode" status signal is $0.5f_{sc}$. This leaves $0.5f_{sc}$ for audio and framing signals. The need for framing bits can emerge where the existing line format would not be suitable for framing the video signal, as found with the exemplary 90A format. As was stated hereinbefore, the audio signals are allotted 1.544 Mb/s, or roughly $0.43f_{sc}$, which is not synchronized to $f_{sc}$. To allow pulse stuffing, a somewhat higher bit rate has to be assigned—one that can also be related to $f_{sc}$ as a ratio of two integers. For the exemplary system, the practical choice can be, for example, $7f_{sc}/16$ or 1.566 Mb/s, which leaves $f_{sc}/16$ for framing.

The above mentioned allocations are summarized in Table I which also indicates the number of bits in a basic N-bit frame for each of the above indicated bits.

TABLE I

| SIGNAL | BIT RATE (in $f_{sc}$) | NUMBER OF BITS PER FRAME |
|---|---|---|
| Video | 24 | 384 |
| Mode Status | ½ | 8 |
| Audio | 7/16 | 7 |
| Framing | 1/16 | 1 |
| Total | 25 | 400 |

Based on the exemplary bit rates and line format of the FT3C system shown in Table I, a 400-bit video signal frame format is formed in the first step by interface multiplexer 14.

Figure 3:
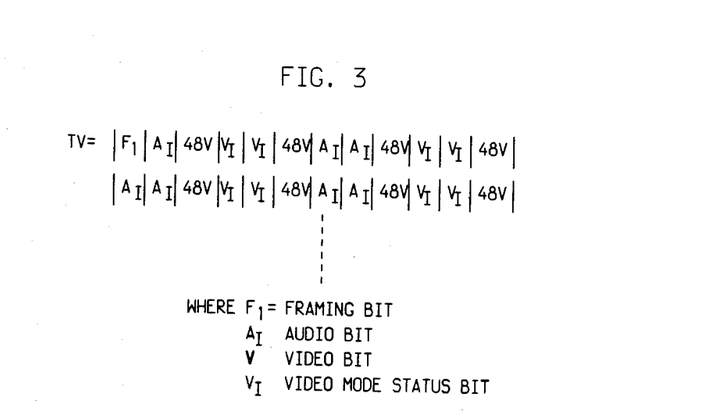
FIG. 3 is a tabular diagram of a preferred framing sequence which includes a frame bit, audio bits, video bits and video mode status bits in predetermined bit positions in accordance with the present invention.
Figure 4:
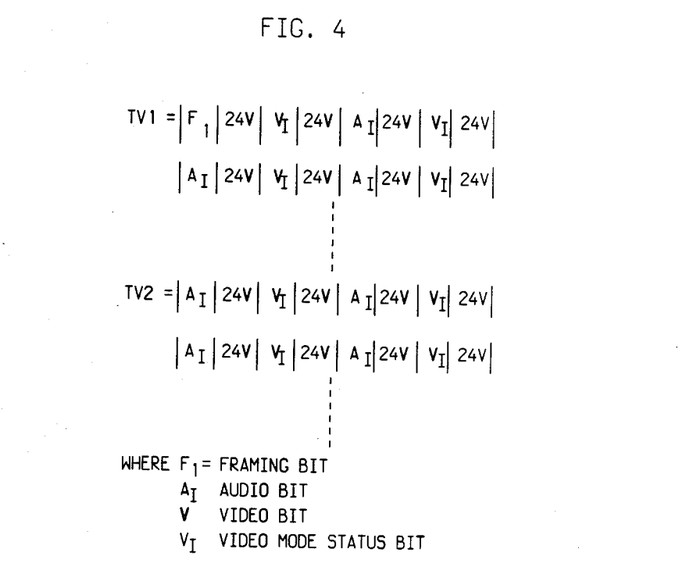
FIG. 4 is a tabular diagram of an alternative framing sequence to that of FIG. 3 which includes a framing bit, audio bits, video bits and video mode status bits in predetermined bit positions in accordance with the present invention.

A typical 400-bit frame format that can be used is shown in FIG. 3. There, it is shown that two audio bits $(A_I)$ or two video mode status bits $(V_I)$ are inserted for every 48 video bits (V). It would seem that one $A_I$-bit, or one $V_I$-bit, for every 24 V-bits might be a better arrangement, as shown in FIG. 4 for TV1 or TV2. Indeed the format of FIG. 4 could be used for certain applications of the present invention. However, under certain other conditions having to do with hardware design, the format of FIG. 3 is preferred. For example, due to the propagation delays of, for example, integrated circuits, it would be easier for interface multiplexer 14 to process two 45 Mb/s rails in parallel rather than one 90 Mb/s signal. The video and audio signal format shown in FIG. 3 is really the result of interleaving two half-rate signals, TV1 and TV2, each at 45 Mb/s as shown in FIG. 4. With regard to the pairing of the $V_I$- and $A_I$-bits in the signal format of FIG. 3, it would seem a better arrangement to interpose the 48 V-bits with $V_I A_I$ pairs instead of $V_I V_I$ and $A_I A_I$ pairs. The reason for pairing the $V_I$-bits, however, is to accommodate the video processor which prefers to receive the $V_I$-bits in pairs.

In the second step, interface multiplexer 14 multiplexes the resultant signal format, shown in FIG. 3 or 4, with the auxiliary and monitor circuit 18 output signals to generate an overall line signal format as shown in FIG. 5. It should be noted that the signal format of FIG. 5 is essentially the same as the signal format of FIG. 1, except that the Ca, Cb, and Cc stuffing indicator bits are replaced by the X-bits; that the parity bit, P, occupies the $P_1$ and $P_2$ bit positions; and that instead of $A_1$ to $A_4$ auxiliary channel bits there is just one auxiliary channel.

As in the 90A format shown in FIG. 1, the $F_1F_0=10$ pair locates the 174 TV-bit blocks. Since the most basic TV frame shown in FIG. 3 is at least 50 bits long (one audio bit, one mode status bit and 48 video bits), the $F_1F_0$ bits are not suitable for framing the video and audio signals. This then explains the need for framing bits in the TV signal format of FIG. 3, and also in FIG. 4. It is to be understood that sequential 400-bit frames are generated in the first step of interface multiplexer 14 which, in the second step, then takes sequential 174-bit sections from the sequential 400-bit frames and inserts each sequential 174-bit section into a respective sequential 174-bit section of the line format of FIG. 5.

The $M_1M_0M_1M_0M_1M_0=101010$ sequence marks the M-frame, and locates the parity bit, P, the auxiliary bits, A, and the X-bits. Parity can be computed, for example, for the $64 \times 174 = 11,136$ TV bits in an M-frame and the parity bit can be, for example, the MOD 2 sum of all of the TV-bits in the previous M-frame.

Figure 6:
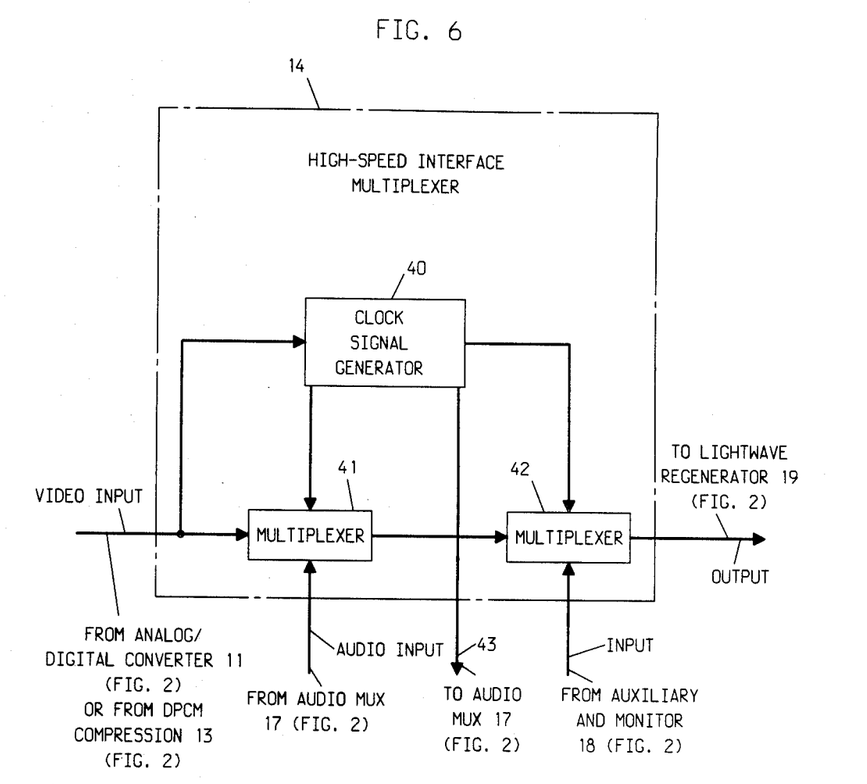
FIGS. 6 and 7 are block diagrams of an exemplary High-Speed Interface Multiplexer and Demultiplexer for use in the transmitter and receiver portions of FIG. 2 respectively.

A typical arrangement for high-speed interface multiplexer 14 is shown in FIG. 6. There, 8 rails of video binary data stream and a clock signal are received from compression circuit 13 or A/D converter 11 in a clock signal generator 40 and a first multiplexer 41. Clock signal generator 40 generates a first multiple of $f_{sc}$ (e.g., $25f_{sc}$) which corresponds to the bit rate of the desired combined video and audio signal format, and a second multiple of $f_{sc}$ (e.g., $25.287f_{sc}$) which corresponds to the desired bit rate of the system signal format to be sent. For purposes of illustration the above-mentioned multiples would be those for use with the exemplary FT3C system. A third clock signal at $(7/16)f_{sc}$ is also generated for the audio signals and transmitted via line 43 to audio multiplexer 17.

First multiplexer 41 functions to multiplex the video signal input with the audio signal input from audio multiplexer 18 using the first multiple clock signals from clock signal generator 40 to derive an output signal with the desired bit rate and format as shown, for example, in FIG. 3 or 4. The output signal from first multiplexer 41 is then multiplexed with the auxiliary and monitor circuit 18 output signals in a second multiplexer 42 using the second multiple clock signals from clock signal generator 40 to generate an output signal having the desired format and bit rate for transmission to circuit 19 and over the desired line or channel.

In summary, in the design of transmitter 10, a predetermined multiple (24.5) of $f_{sc}$ is assigned to the video signal, and another predetermined multiple (0.5) of $f_{sc}$ is assigned for audio to accommodate all the television needs and be below the line rate of the system used for transmission. On top of these television needs is added the prior used signal format of the system used for transmission, e.g., the 90A signal format. Since the 90A signal format overhead is approximately 1 percent, it brings the total output rate of the present system ato almost exactly the same as the FT3C frequency using the exemplary design parameters hereinbefore described. The advantages of such design, therefore, are that (1) the output rate is effectively the same as the FT3C rate (90.517 Mb/s vs. 90.524 Mb/s for a deviation of 70 ppm); (2) it utilizes the FT3C line format and all the associated benefits; (3) it can allow up to four sound channels or one T1 channel; (4) the auxiliary bits in the 90A format of FIG. 1 can be used for telemetry and maintenance purposes, if needed; and (5) some extra capacity (193 Kb/s) exists as a result of the unused stuff indicator bits (Ca, Cb, and Cc bits in FIG. 1).

Turning now to receiver 30 in FIG. 2, the lightwave signal from the exemplary FT3C line is converted to an equivalent digital electrical signal in lightwave detector 31. The output signal from detector 31 is received in a high-speed demultiplexer 32 which functions in a manner opposite to that of interface multiplexer 14 of transmitter 10. More particularly, demultiplexer 32 functions to detect the framing bits of the signal format shown in FIG. 5 and transmit all auxiliary and monitoring bits to auxiliary and monitor circuit 33, and the audio and television signals in each of the 174-bit TV sections of FIG. 5 to audio demultiplexer 34 and optional expansion circuit 37, respectively, in accordance with the format of FIG. 3 or 4 used by the transmitter's interface multiplexer 14.

Figure 7:
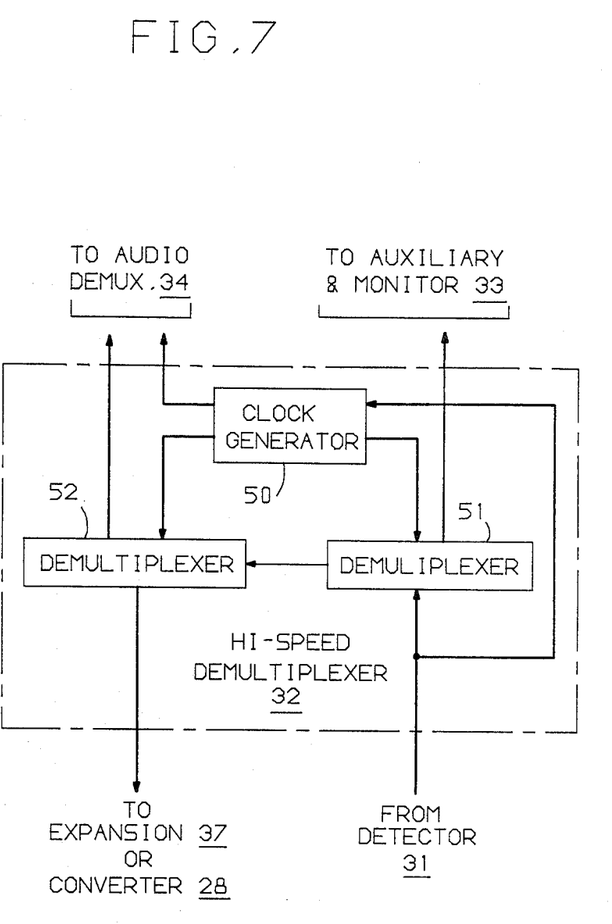

A typical arrangement for high-speed demultiplexer 32 is shown in FIG. 7 and, as stated above, is the inverse of high-speed multiplexer 14 of FIG. 6.

In FIG. 7 the digital output signal from detector 31 is received in a clock signal generator 50 and a first demultiplexer 51. Clock signal generator 50 functions to generate (a) a first multiple of the color subcarrier frequency $f_{sc}$ (e.g., 25.287$f_{sc}$) which corresponds to the desired bit rate of the received system signal format, (b) a second multiple of $f_{sc}$ (e.g., 25$f_{sc}$) which corresponds to the bit rate of the combined video and audio signal format within the received signal, and (c) a third multiple of $f_{sc}$ (e.g., 7/16$f_{sc}$) for use in demultiplexing the audio signals in demultiplexer 34.

First demultiplexer 51 functions to demultiplex (a) the auxiliary and monitor signals and (b) the combined video signal and audio signals in the received signal format using the first multiple of the color subcarrier frequency.

The auxiliary and monitor signals are transmitted to auxiliary and monitor means 33 while the combined video and audio signals are transmitted to a second demultiplexer 52. Second demultiplexer 52 functions to demultiplex the video signal and the audio signals using the second multiple of the color subcarrier frequency and transmits the audio signals to audio demultiplexer 34 and the video signal to DPCM expansion means 37 or D/A converter 38.

It is to be understood that expansion circuit 37 will only be present in receiver 30 when a compression circuit 13 was used in transmitter 10. When present, expansion circuit 37 functions to expand the received video signal by an amount equal and opposite to the compression factor used by compression circuit 13 in transmitter 10. The output of optional expansion circuit 37 is then transmitted to digital-to-analog (D/A) converter 38 to provide the analog video signal to the end user.

The audio signal portion in the received format of FIG. 3 or 4 is transmitted from high-speed demultiplexer 32 to an audio demultiplexer 34 which functions in a manner opposite to that of multiplexer 17 of transmitter 10. Essentially, audio demultiplexer 34 functions to transmit each received audio signal over a separate path to a separate D/A converter 35. In the exemplary system where only two audio signals are transmitted by transmitter 10, the first and second audio signals are converted in D/A converters $35_1$ and $35_2$, respectively, into their equivalent 15 KHz analog signals.

It is to be understood that the above-described embodiments are simply illustrative of the principles of the invention. Various other modifications and changes may be made by those skilled in the art which will embody the principles of the invention and fall within the spirit and scope thereof. For example, the present invention could be adapted for transmitting Phase Alternating Line (PAL) television system signals, instead of the NTSC signals used in the formats of FIGS. 3–5, by synchronizing to appropriate multiples of the color subcarrier frequency ($f_{sc}$) of that television signal's format to permit a proper multiplexing of the video and audio signals into words with a first predetermined bit rate, and then multiplexing the resultant combined video and audio signals, and the auxiliary and monitoring information, into a system signal format with a proper line rate for transmission over a desired line. It is to be further understood that the arrangement in FIG. 6 of interface multiplexer 14 is a typical arrangement and is for purposes of illustration and not for purposes of limitation. Any suitable arrangement for interface multiplexer 14 or demultiplexer 32 can be substituted.

What is claimed is:

1. A transmitter capable of transmitting a video input signal and a plurality of audio input signals over an output channel, the transmitter comprising:
    first converting means capable of converting samples of the video input signal and associated video processor mode status signals into a video output signal including representative S-bit digital words using a sampling rate which is a predetermined multiple of a subcarrier frequency of the video input signal;
    second converting means capable of converting each of the plurality of audio input signals into a separate representative digital output signal;
    first multiplexing means capable of multiplexing the plurality of digital output signals from the second converting means into a digital output signal comprising a predetermined sequence of bits;
    means capable of generating appropriate binary monitoring and supplementary data bits; and
    second multiplexing means comprising
        a first multiplexer capable of multiplexing the video output signal from the first converting means and the audio output signal from the first multiplexing means to generate a first output signal including sequential N-bit frames, each N-bit frame comprising alternating multiples of one or more audio bits and video processor mode status bits and each sequential multiple of the audio and video mode status bits is separated by a predetermined plurality of sequential video signal bits, and a second multiplexer capable of multiplexing the first output signal from the first multiplexer with the output signal from the monitoring and supplementary data bit generating means to generate an output signal comprising a signal format which includes alternating multiples of monitoring and supplementary data bits and sequential predetermined subframe portions of sequential N-bit frames forming the first output signal of the first multiplexer for transmission over the output channel.

2. A transmitter according to claim 1 wherein the transmitter further comprises compression means disposed between the first converting means and the second multiplexing means for appropriately compressing the representative digital words of the video signal at the output of the first converting means by a predetermined compression factor to provide a predetermined signal rate which is less than a signal rate of the output signal from the second multiplexer of the second multiplexing means.

3. A transmitter according to claim 1 wherein the first multiplexer of the second multiplexing means multiplexes the video output signals from the first converting means and the audio output signals from the first multiplexing means at a bit rate which is a second predetermined multiple of the subcarrier frequency of the video input signal and is less than a predetermined line rate of the output channel.

4. A transmitter according to claim 3 wherein the second multiplexer of the second multiplexing means multiplexes the output signals from the first multiplexer and the supplementary data bit generating means at a bit rate which is a third multiple of the subcarrier frequency of the video input signal and is substantially the same as the predetermined line rate of the output channel.

5. A transmitter according to claim 1 wherein the second multiplexer of the second multiplexing means multiplexes the output signals from both the first multiplexer and the supplementary data bit generating means at a bit rate which is a second predetermined multiple of the subcarrier frequency of the video input signal and is substantially the same as a predetermined line rate of the output channel.

6. A transmitter according to claim 1 wherein the output signal from the first multiplexer of the second multiplexing means includes N-bit frames comprising alternating pairs of audio bits and video mode status bits which are separated by said predetermined plurality of sequential video signal bits.

7. A transmitter according to claim 1 wherein the output signal from the first multiplexer of the second multiplexing means includes N-bit frames comprising alternating audio and video mode status bits which are separated by said predetermined plurality of sequential video signal bits.

8. A receiver capable of receiving an input signal comprising a digitized video signal, a plurality of digitized audio signals, and a plurality of monitoring and supplementary digitized data signals in a predetermined system signal format and at a predetermined bit rate, where (a) the video signal and the audio signals and (b) the predetermined system signal format are synchronized to a predetermined first and second multiple, respectively, of a video subcarrier frequency of the received video signal, the receiver comprising:

first demultiplexing means comprising
  a first demultiplexer capable of demultiplexing, at the second multiple of the video subcarrier frequency, (a) the monitoring and supplementary data signals and (b) the audio and video signals in each system signal format into a first and a second output signal, respectively, and a second demultiplexer capable of demultiplexing the second output signal from the first demultiplexer into (a) a first output signal comprising the video signal and (b) a second output signal comprising the plurality of audio signals at the first multiple of the video subcarrier frequency;

second demultiplexing means capable of demultiplexing the plurality of audio signals in the second output signal from the second demultiplexer of the first demultiplexing means into a corresponding plurality of separate audio signal bit streams;

first converting means capable of converting each of the plurality of audio signal bit streams from the second demultiplexing means into a separate representative analog signal;

second converting means capable of converting the first output signal comprising the video signal from the second demultiplexer of the first demultiplexing means into representative analog samples; and means capable of detecting the first output signal from the first demultiplexer of the first demultiplexing means and applying the monitoring and 44 supplementary data signals for a predetermined use.

9. A receiver according to claim 8 wherein the receiver further comprises expansion means disposed to receive the first output signal from the second demultiplexer of the first demultiplexing means for expanding the digital video signal by a predetermined expansion factor.

10. A receiver according to claim 8 wherein the second converting means uses a conversion sampling rate which is a third multiple of the video subcarrier frequency.

11. A receiver according to claim 8 wherein the second output signal from the first demultiplexer of the first demultiplexing means comprises N-bit frames including alternating pairs of audio bits and video mode status bits which are separated by a predetermined plurality of sequential video signal bits.

12. A receiver according to claim 8 wherein the second output signal from the first demultiplexer of the first demultiplexing means comprises alternating audio and video mode status bits which are separated by a predetermined plurality of sequential video signal bits.

* * * * *